United States Patent
Afriat

(10) Patent No.: US 7,405,727 B2
(45) Date of Patent: Jul. 29, 2008

(54) LIFT DETECTION MECHANISM FOR OPTICAL MOUSE SENSOR

(75) Inventor: Gil Afriat, Monument, CO (US)

(73) Assignee: EM Microelectronic-Marin SA, Marin (CH)

(*) Notice: Subject to any disclaimer, the term of this patent is extended or adjusted under 35 U.S.C. 154(b) by 507 days.

(21) Appl. No.: 11/011,164

(22) Filed: Dec. 15, 2004

(65) Prior Publication Data

US 2006/0125794 A1 Jun. 15, 2006

(51) Int. Cl.
G09G 5/08 (2006.01)
(52) U.S. Cl. ............... 345/166; 345/161; 345/162; 345/163; 345/167
(58) Field of Classification Search ......... 345/161–167, 345/857, 156, 157, 173; 250/205, 201.3, 250/221, 370.08; 382/312; 715/857; 359/506; 702/58
See application file for complete search history.

(56) References Cited

U.S. PATENT DOCUMENTS

| | | | |
|---|---|---|---|
| 5,557,097 A * | 9/1996 | Ortyn et al. ............... 250/201.3 |
| 5,757,360 A * | 5/1998 | Nitta et al. ............... 345/156 |
| 6,124,587 A | 9/2000 | Arreguit et al. |
| 6,195,475 B1 * | 2/2001 | Beausoleil et al. ......... 382/312 |
| 6,249,603 B1 | 6/2001 | Rucklidge |
| 6,362,482 B1 * | 3/2002 | Stettner et al. ......... 250/370.08 |
| 6,806,458 B2 * | 10/2004 | Rotzoll et al. ............. 250/221 |
| 7,078,673 B1 * | 7/2006 | Afriat ..................... 250/221 |
| 7,122,781 B2 * | 10/2006 | Rotzoll et al. ............. 250/221 |
| 7,124,041 B1 * | 10/2006 | Johnson et al. ............. 702/58 |
| 7,220,956 B2 * | 5/2007 | Feldmeier et al. ........... 250/221 |
| 7,221,356 B2 * | 5/2007 | Oliver et al. ............... 345/166 |
| 7,230,606 B2 * | 6/2007 | Ahn ....................... 345/166 |
| 2002/0185617 A1 | 12/2002 | Oliver et al. |
| 2003/0034959 A1 * | 2/2003 | Davis et al. ............... 345/166 |
| 2003/0058222 A1 | 3/2003 | Casebolt et al. |
| 2004/0070565 A1 * | 4/2004 | Nayar et al. ............... 345/156 |
| 2004/0120018 A1 * | 6/2004 | Hu ......................... 358/506 |
| 2004/0130532 A1 | 7/2004 | Gordon et al. |
| 2004/0135825 A1 * | 7/2004 | Brosnan ................... 345/857 |
| 2005/0001142 A1 * | 1/2005 | Lauffenburger et al. ..... 250/205 |
| 2005/0078087 A1 * | 4/2005 | Gates et al. ............... 345/163 |
| 2005/0190157 A1 * | 9/2005 | Oliver et al. ............... 345/166 |
| 2006/0197744 A1 * | 9/2006 | Tiphane et al. ............. 345/157 |
| 2007/0103439 A1 * | 5/2007 | Gordon et al. ............. 345/163 |
| 2007/0139379 A1 * | 6/2007 | Kehlstadt et al. ........... 345/163 |
| 2008/0042982 A1 * | 2/2008 | Gates et al. ............... 345/173 |

FOREIGN PATENT DOCUMENTS

| EP | 1 043 688 | 10/2000 |
|---|---|---|
| WO | WO 03/049018 A1 | 6/2003 |

OTHER PUBLICATIONS

Pending U.S. Appl. No. 10/609,686 filed Jul. 1, 2003.

* cited by examiner

*Primary Examiner*—Prabodh Dharia
(74) *Attorney, Agent, or Firm*—Sughrue Mion, PLLC

(57) ABSTRACT

A method for detecting a lift condition from an illuminated surface portion of an optical motion sensing device. According to a first embodiment, two different "loss-of-focus" thresholds are used. A first threshold is used when the optical pointing device is not moving, and a second threshold greater than the first one is used when the optical pointing device is moving. The optical device further requires means for detecting whether it is moving or not. According to a second embodiment, a dynamical loss-of-focus threshold depending on an average number of motion features that the surface exhibits to the sensor of the optical pointing device is used.

13 Claims, 5 Drawing Sheets

LIFT DETECTION MECHANISM FOR OPTICAL MOUSE SENSOR

FIELD OF THE INVENTION

The present invention generally relates to pointing devices, in particular for controlling the position of a cursor on a screen, such as the display of a personal computer, workstation or other computing devices having a graphic user interface. Such pointing devices may for instance include mice, trackballs and other computer peripherals for controlling the position of a cursor on a display screen.

The present invention more particularly relates to the field of optical sensing motion devices which comprise a sensing unit coupled to a photodetector array for detecting and measuring a relative motion with respect to the illuminated surface portion and extracting motion features there from to detect a lift condition of the optical device.

BACKGROUND OF THE INVENTION

Such optical pointing devices are already known in the art, International Patent Application No. WO 03/049018 A1, filed in the name of the same Assignee and enclosed herewith by way of reference, describes a motion detection device for detecting relative motion with respect to an illuminated portion of a surface.

As illustrated on FIG. 5, this motion detection device comprises a photodetector array 120 including a plurality of pixels aligned along first and second axes for detecting a light intensity pattern of illuminated portion surface S by means of light source 110. Comparator means 115 are coupled to photodetector array 120 for comparing light intensity between pixels of the photodetector array along both axes and for outputting edge direction data from the detected light intensity pattern. This data is descriptive of light intensity differences between the compared pixels and includes a first edge condition, or positive edge, defined as a condition wherein the light intensity of a first pixel is less than the light intensity of a second pixel and a second edge condition, or negative edge, defined as a condition wherein the light intensity of the first pixel is greater than the light intensity of the second pixel.

The motion detection device further comprises processing means 100 for extracting edge inflection data from the edge direction data. This edge inflection data is descriptive of the succession of positive and negative edges along one of the two axes of the photodetector array and includes a first inflection condition, or peak, defined as the succession, along one axis, of a positive edge followed by a negative edge and a second inflection condition, or null, defined as the succession of a negative edge followed by a positive edge.

Processing means 100 further comprises means for comparing locations of the inflection conditions with previous locations of the inflection conditions, means for determining the direction of motion of the inflection conditions along both axes based on the result of the location comparison and means for computing an overall displacement measurement from the determined direction of motion of the inflection conditions. This motion detection method is called "Peak/Null Motion Detection".

With "Peak/Null Motion Detection", the number of inflections "seen" by the photodetector is dependent on the sensor focus. In particular, the inflection count will decrease substantially if the sensor is out of focus (the sensor "sees" less features). This property can therefore be exploited in order to provide "loss-of-focus" information. This can easily be implemented by counting the total number of X inflections and Y inflections and comparing either count (X or Y inflections) with a pre-determined threshold. If this count is less than the predetermined threshold, a "loss-of-focus" condition will be detected and reported as a warning signal to an external controller 200. This "loss-of-focus" information may be used for lift detection of the optical sensor.

A reliable detection of optical pointing device lift condition is essential for low power applications (e.g. wireless mouse). In fact, once the optical pointing device is lifted, the optical system as mentioned before "goes out of focus" and "sees" less motion features. The motion features seen by the sensor become "blurry", and noise becomes more dominant, the signal-to-noise ratio being strongly decreased. This results in a spurious motion detected by the sensor even if the optical pointing device is not moving (e.g. one side of the optical pointing device is resting on an object taller than the surface in such a manner that the optical pointing device is inclined). This spurious motion will not allow the optical pointing device to enter a so-called "Sleep Mode", i.e. low consumption mode, since the processing means interpret reported motion from the sensor as an indication that the optical pointing device is being used, and thus would result in a significant power cost.

In the International Patent Application No. WO 03/049018 A1, the lift detection mechanism uses a "hard" or predetermined threshold of number of motion features, for instance the number of edge inflection data, also called hereafter loss-of-focus threshold (LoFth). Once this LoFth threshold is crossed, i.e. number of motion features seen by the sensor is lower than the LoFth threshold, a lift condition is detected.

Since different surfaces present a different average number of motion features to the sensor, for example for a 30×30 pixel array, the average number of motion features is in the range of 90 to 400, therefore no predetermined value can fit in order to obtain both a good sensing motion and a good lift condition detection. If the loss-of-focus threshold is set low, then lift condition will not be detected for surfaces, which exhibit a large amount of motion features to the sensor. In contrast, if the loss-of-focus threshold is set high, then lift condition will be detected even when the mouse is not lifted on surfaces, which exhibit a small amount of motion features to the sensor. This false lift detection will interrupt the normal motion detection of the sensor, which is not user convenient.

That is why the solution presented in the International Patent Application No. WO 03/049018 A1 is either not reliable enough for detecting a lift condition if the LoFth value is set low or not enough sensitive to motion if the LoFth is set high and anyway is not optimum in term of power savings.

SUMMARY OF THE INVENTION

Thus, for improving power consumption, it is important to reliably detect a lift condition when the mouse is in rest (e.g. the user left one side of the mouse resting on an object taller than the surface, and now is gone). A reliable detection of a lift condition in this case will enable the system to enter a sleep mode and save power. Also, a false detection of a lift condition, when the mouse is in rest (not moving), does not interrupt the normal motion detection of the sensor, since motion is zero anyway.

It is then an object of the present invention to ensure a reliable detection of a lift condition of an optical pointing device whichever kind of surfaces is used with the optical pointing device and thus enable significant power savings.

In order to achieve the above mentioned object, according to a first aspect of the present invention, it is provided with a first method for detecting lift condition of an optical pointing device using at least two different "loss-of-focus" thresholds. A first threshold is used when the optical pointing device is moving, and a second threshold greater than the first one is used when the optical pointing device is in rest, i.e. not moving. For that purpose, the optical device further requires means for detecting whether it is moving or not. A method for detecting if the mouse is in rest is done by looking at the flash rate, which is adjusted to the motion speed. A flash rate threshold is defined, equal or below which the optical device is assumed to be in rest. A simple setting for this threshold may be the minimum flash rate allowed in the system.

According to a second aspect of the invention, it is provided with a second method for detecting lift condition of an optical pointing device using a dynamical loss-of-focus threshold depending on an average number of motion features that the surface exhibits to the sensor of the optical pointing device.

BRIEF DESCRIPTION OF THE DRAWINGS

Other aspects, features and advantages of the present invention will be apparent upon reading the following detailed description of non-limiting examples and embodiments made with reference to the accompanying drawings.

DETAILED DESCRIPTION OF THE INVENTION

Figure 1:
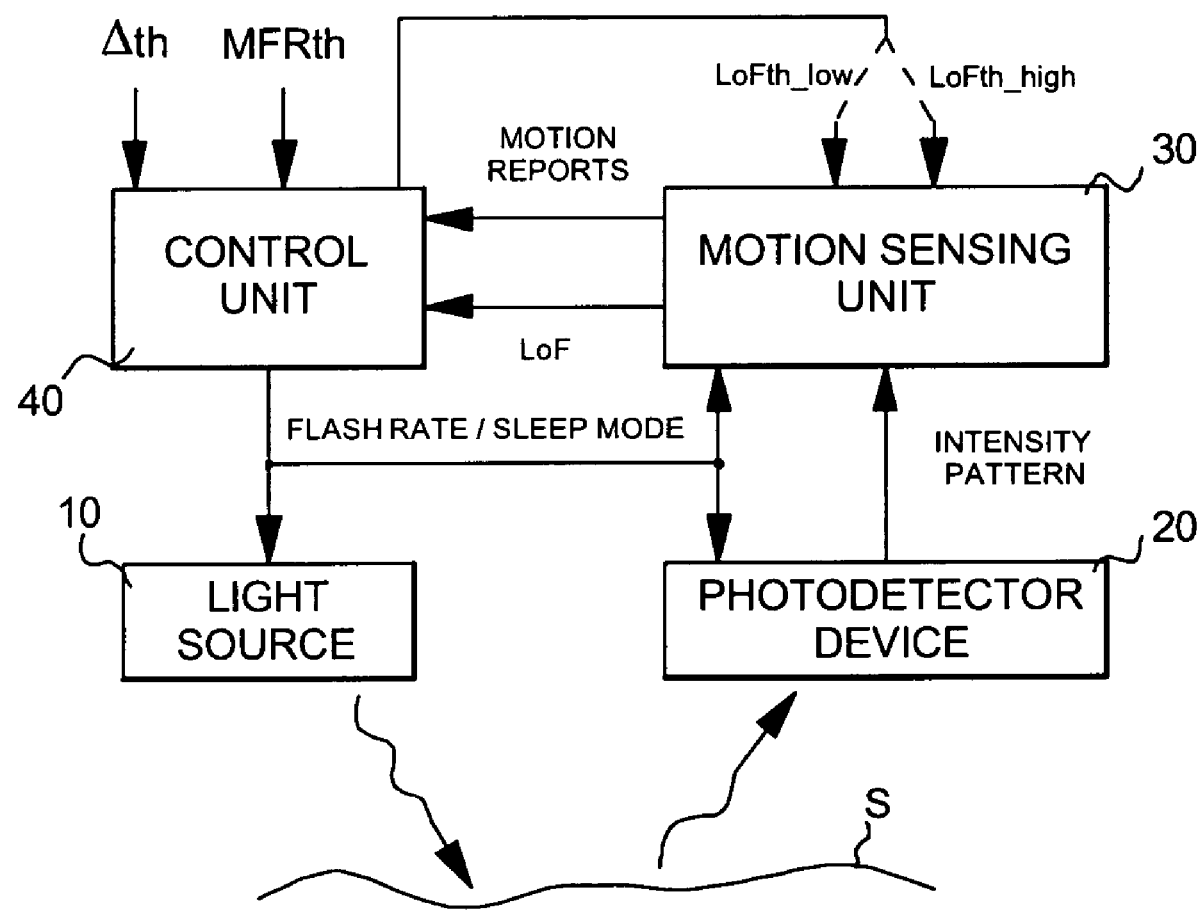
FIG. 1 is a schematic illustration of a first embodiment of an optical motion sensing device according to the present invention.

FIG. 1 illustrates schematically an optical motion sensing device according to a first embodiment of the present invention. It basically consists in an optical sensing system comprising a light source 10 for illuminating a portion of a surface S with radiation, a photodetector device 20, which may be a photodetector array including a plurality of pixels aligned along two axes, responsive to radiation reflected from the illuminated surface portion S, and a motion sensing unit 30, coupled to the output of photodetector device 20, for detecting and measuring relative motion of the optical motion sensing device with respect to the illuminated surface portion S.

During each period of activation, or flash, light source 10 is activated to illuminate the surface portion S, photodetector device 20 is activated to capture an image or intensity pattern of the illuminated surface portion S and motion sensing unit 30 is activated to detect and measure relative motion with respect to the illuminated surface portion based on a comparison of the intensity pattern detected by the photodetector device 20 and a previous intensity pattern detected by photodetector device 20 during a previous flash period. Motion sensing unit 30 outputs motion reports that are each representative of a magnitude of the detected relative motion. The rate at which activation of light source 10, photodetector device 20 and motion sensing unit 30 is repeated will be defined as the "flash rate".

The optical motion sensing device further comprises a control unit 40, which purpose is in particular to adjust the flash rate (i.e. the rate of activation of light source 10, photodetector device 20 and motion sensing unit 30) as a function of the magnitude of the detected relative motion. The motion reports from motion sensing unit 30 are thus fed to control unit 40 to provide a basis and reference for performing this adjustment of the flash rate.

More particularly, control unit 40 is adapted to compare the magnitude of the detected relative motion with a determined relative motion threshold, designated $\Delta$th, and increase or decrease the flash rate if the magnitude of the detected relative motion is respectively greater or lower than the relative motion threshold $\Delta$th. Accordingly, if the motion reported by the sensor is larger than the relative motion threshold, the flash rate is increased (i.e. the time between flashes decreases) and if this reported motion is lower than the threshold, the flash rate is decreased (i.e. the time between flashes increases).

According to this first embodiment of the present invention, control unit 40 is further adapted to compare the adjusted flash rate with a determined flash rate threshold (MFRth), which is preferably chosen as being the minimum flash rate allowed by the optical sensing system. Control unit 40 determines whether the optical motion sensing device is moving or not based on the result of the comparison. If the current flash rate is greater than the determined flash rate threshold then it is assumed that the optical motion sensing device is moving. If the current flash rate is less or equal to the determined flash rate threshold then it is assumed that the optical motion sensing device is not moving, i.e. is in rest.

As mentioned herein before, the main goal of the present invention is to reliably detect a lift condition (by means of "loss of focus" detection) of the optical motion sensing device in order to enter sleep mode or low consumption mode, in which motion reports from the motion sensing unit 30 are ignored, then no motion being reported to the control unit 40 and further to the workstation or other controlled computing devices, and thus save power. For that purpose control unit 40 is furthermore adapted to switch between a first loss-of-focus threshold (LoFth_low) if the optical motion sensing device is moving and a second loss-of-focus threshold (LoFth_high) greater than the first loss-of-focus threshold if the optical motion sensing device is not moving. These loss-of-focus thresholds are representative of limits under which the photodetector goes out of focus, i.e. sees less motion features than the loss-of-focus threshold, and then the optical device is considered as being lifted.

Since the optical motion sensing device is moving, the photodetector shall not be interrupted by an out of focus command and for that reason, the first loss-of-focus threshold is set low and preferably to zero. In contrast, when the optical motion sensing device is in rest, not moving, the loss-of-focus threshold shall be greater in order to avoid motion detection due to spurious or noise motion. For that reason, the second loss-of-focus threshold is set high, at least greater than the first loss-of-focus threshold. For a given photodetector array comprising a defined number of pixels, the second loss-of-focus threshold may be set between 5% and 20% of the maximum total number of motion features detectable by the photodetector. For example, with an array of 30×30 pixels array, the maximum number of detectable motion features is about 800 along each axis, and then the second loss-of-focus threshold may preferably be chosen between 40 and 160. Advantageously, a threshold fixed at 10% corresponding to a value of 80, is chosen because it presents the advantage of being able to be more or less suitable for all kind of surfaces.

In function of rest condition detection, control unit 40 sets the adequate first or second loss-of-focus threshold to motion unit 30.

Motion sensing unit 30 is further adapted to extract motion features from the detected relative motion. These motion features may be for example edge inflection data extracted from edge direction data. According to a first approach, this edge direction data is descriptive of light intensity differences between compared pixels of the photodetector array within the current intensity pattern. According to a second approach, this edge direction data is descriptive of light intensity differences of a pixel within the current intensity pattern and the same pixel within the previous intensity pattern detected during a previous flash period.

For both approaches, edge direction data includes a first edge condition, or positive edge, defined as a condition wherein the light intensity of a first pixel is less than the light intensity of a second pixel (the same pixel at a different time according to the second approach) and a second edge condition, or negative edge, defined as a condition wherein the light intensity of the first pixel is greater than the light intensity of the second pixel.

The extracted edge inflection data is descriptive of the succession of positive and negative edges along one of the two axes of the photodetector array, according to the first approach, or respectively during two successive flashes, according to the second approach. The edge inflection data includes a first inflection condition, or peak, defined as the succession, along one axis (first approach), or respectively during two successive flashes (second approach), of a positive edge followed by a negative edge and a second inflection condition, or null, defined as the succession of a negative edge followed by a positive edge. For sake of simplicity, in the following description only reference to the first approach will be made, however, it will be appreciated that it can also be done with the second approach.

Still according to the first embodiment of the present invention, motion sensing unit 30 is adapted to count, during a flash period, the total number of extracted motion features and to provide a loss-of-focus signal (LoF) to control unit 40 if this total number of motion features is less than the loss-of-focus threshold set by control unit 40. This loss-of-focus signal is representative of a lift condition of the optical device.

Thus when control unit 40 receives a loss-of-focus signal (LoF) from motion sensing unit 30, it commands the optical motion sensing device, namely light source 10, photodetector 20 and motion sensing unit 30, to enter a so-called sleep mode, for instance a low consumption mode in which motion reports from the sensing unit is ignored and further power output of the light source can be reduced. In addition, other components of the pointing device that are not directly used for tracking motion with respect to the surface (such as a wireless transmitter or actuator device not represented) could be switched into a low power consumption mode or even completely switched off for the purpose of saving power. In particular, some optical mice are provided with so-called "rollers" that are actuated by a finger and which are provided for comfort purposes and therefore disabling such an actuator device will, on the one hand, save significant power and, on the other hand, not greatly affect operation of the pointing device as a whole.

Figure 2:
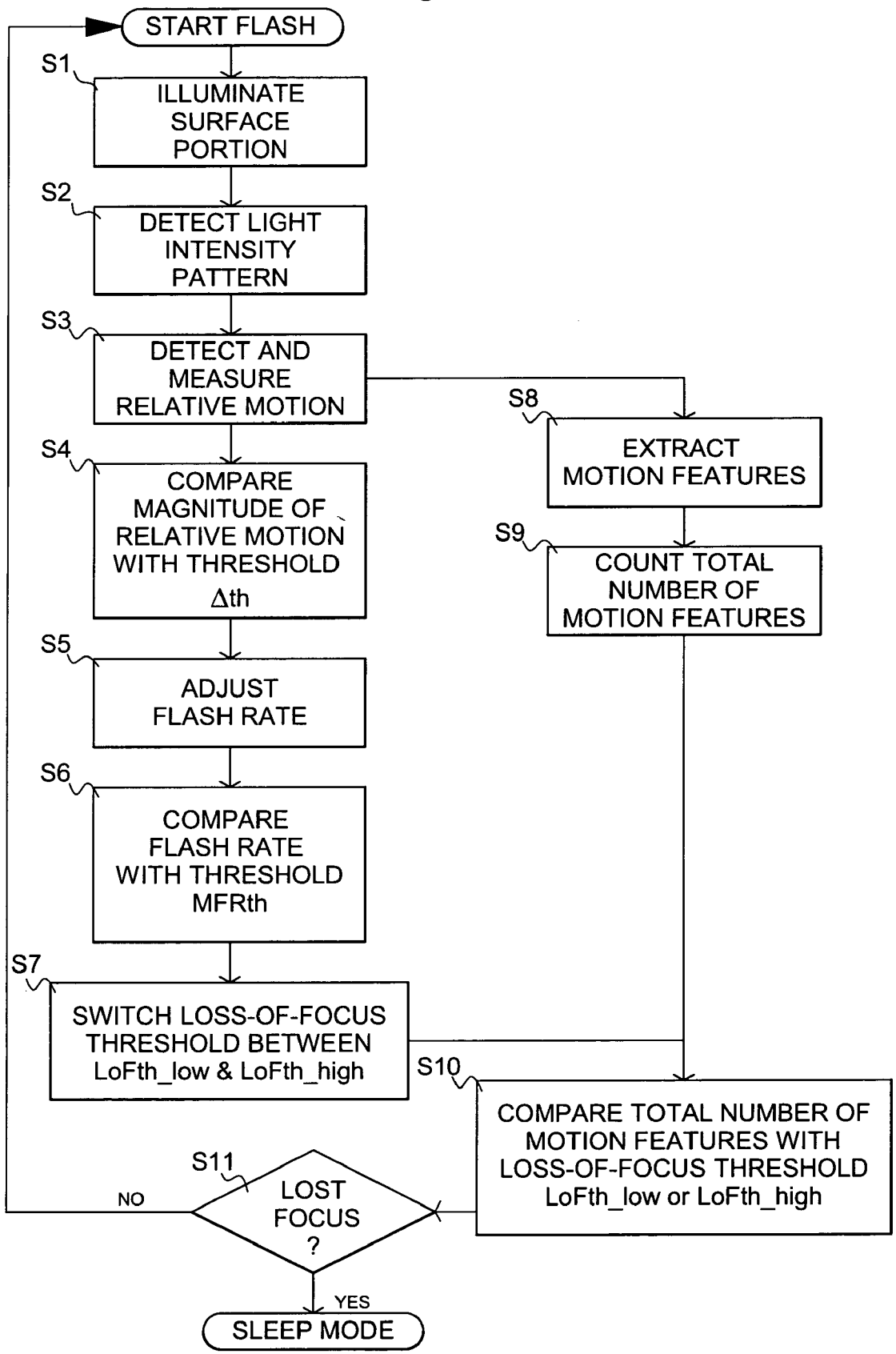
FIG. 2 is a flow chart showing the basic operations of the optical motion sensing device according to the first embodiment.

FIG. 2 is a flow chart showing the basic operations of the optical motion sensing device according to the first embodiment for detecting a lift condition from an illuminated surface portion, where steps S1 to S12 respectively designate the steps of:

(S1): illuminating surface portion S by means of light source 10;
(S2): detecting the light intensity pattern reflected from surface portion S by means of photodetector device 20;
(S3): detecting and measuring relative motion of the optical motion sensing device with respect to the illuminated surface portion S;
(S4): comparing the magnitude of the detected relative motion with the relative motion threshold ($\Delta$th);
(S5): adjusting accordingly the flash rate; i.e. increasing or decreasing the flash rate if the magnitude of the detected relative motion is respectively greater or lower than the relative motion threshold ($\Delta$th);
(S6): comparing the adjusted flash rate with a predetermined flash rate threshold (MFRth) and determining there from whether the optical sensing device is moving or not; i.e. if the adjusted flash rate is greater than the predetermined flash rate threshold (MFRth) then the optical sensing device is considered as moving and if the flash rate threshold is equal or lower than the predetermined flash rate threshold (MFRth) then the optical motion sensing device is considered as not moving;
(S7): switching between a low, respectively high, loss-of-focus threshold (LoFth_low, LoFth_high) if the optical motion sensing device is moving, or respectively not moving;
(S8): extracting motion features from the detected relative motion;
(S9): counting the total number of motion features extracted there from;
(S10): comparing the total number of motion features extracted with the selected low or high loss-of-focus threshold;
(S11): determining if the photodetector is out of focus; i.e. detection of a lift condition of the optical motion sensing device if the total number of motion features is below the selected loss-of-focus threshold;
(S12): if so, entering a sleep mode.

It has to be noted that steps 4 to 7, on the one hand, and steps 8 and 9, on the other hand, can be done in parallel.

Advantageously, flash rate threshold MFRth is set as the minimum flash rate allowed in the system.

Figure 3:
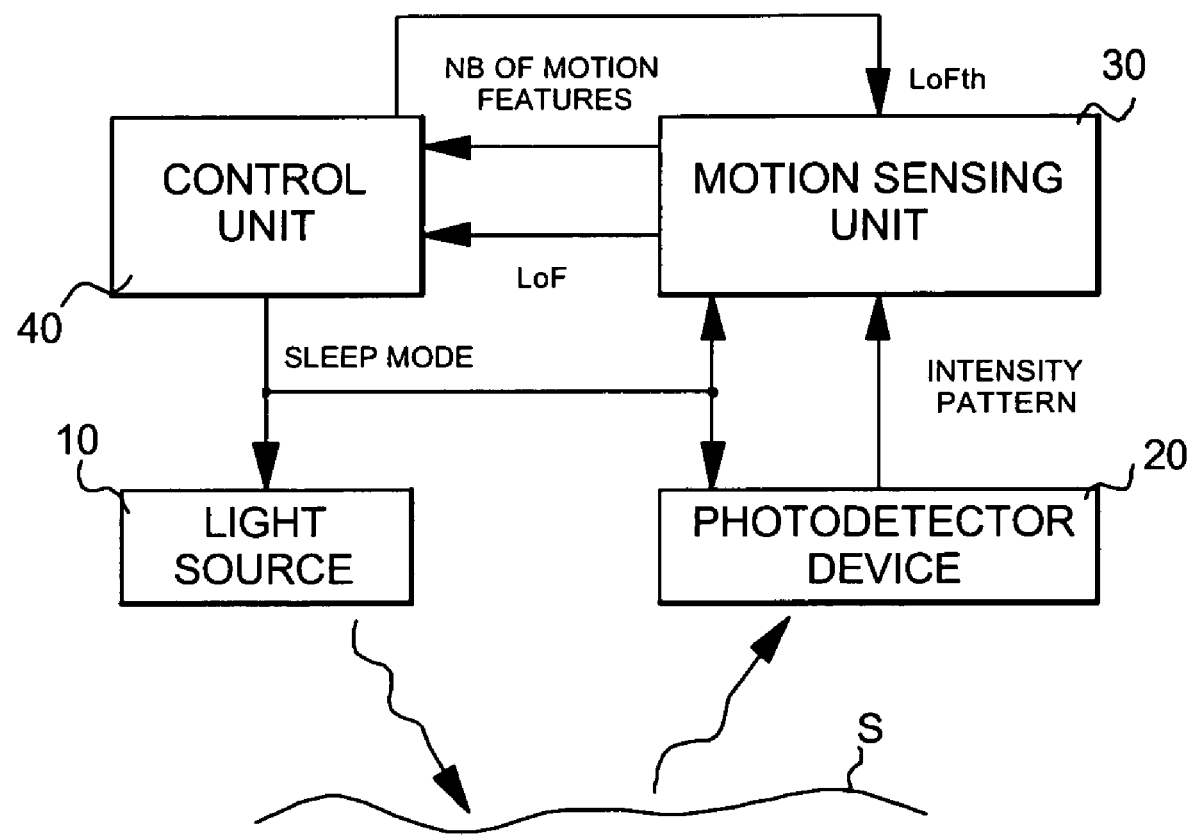
FIG. 3 is a schematic illustration of a second embodiment of an optical motion sensing device according to the present invention.

FIG. 3 is a schematic illustration of a second embodiment of an optical motion sensing device according to the present invention. Like in FIG. 1, it shows light source 10 for illuminating portion surface S with radiation, photodetector device 20 responsive to radiation reflected from the illuminated surface portion, motion sensing unit 30 coupled to photodetector device 20 for detecting and measuring a relative motion with respect to the illuminated surface portion.

Motion sensing unit 30 is further adapted to extract motion features from the detected relative motion and count a total number of the extracted motion features. The total number of motion features is sent to control unit 40 for each flash period. Control unit 40 computes an average value (A) with at least some of the previous total number of motion features received over a sliding predetermined period of time. For example, the computing function can be an average value of the last N total numbers of motion features received. According to another example, the computing function can be an average value of N non successive total numbers of motion features received every $M^{th}$ flashes or in another words an average value calculated by averaging the total number of motion features received during non successive flashes (e.g. every $M^{th}$ flashes). A reasonable choice for N might be in the range of 10 to 100. Control unit 40 is further adapted to determine a loss-of-focus threshold (LoFth) as a function of the computed average value. Preferably, the loss-of-focus threshold is chosen as being half the computed average value (LoFth=A/2).

This second embodiment present the main advantage to be independent from the surface portion used to detect motion. Whatever is the average total number of motion features seen by the photodetector; the loss-of-focus condition takes it into account and therefore always ensures reliable lift detection.

Figure 4:
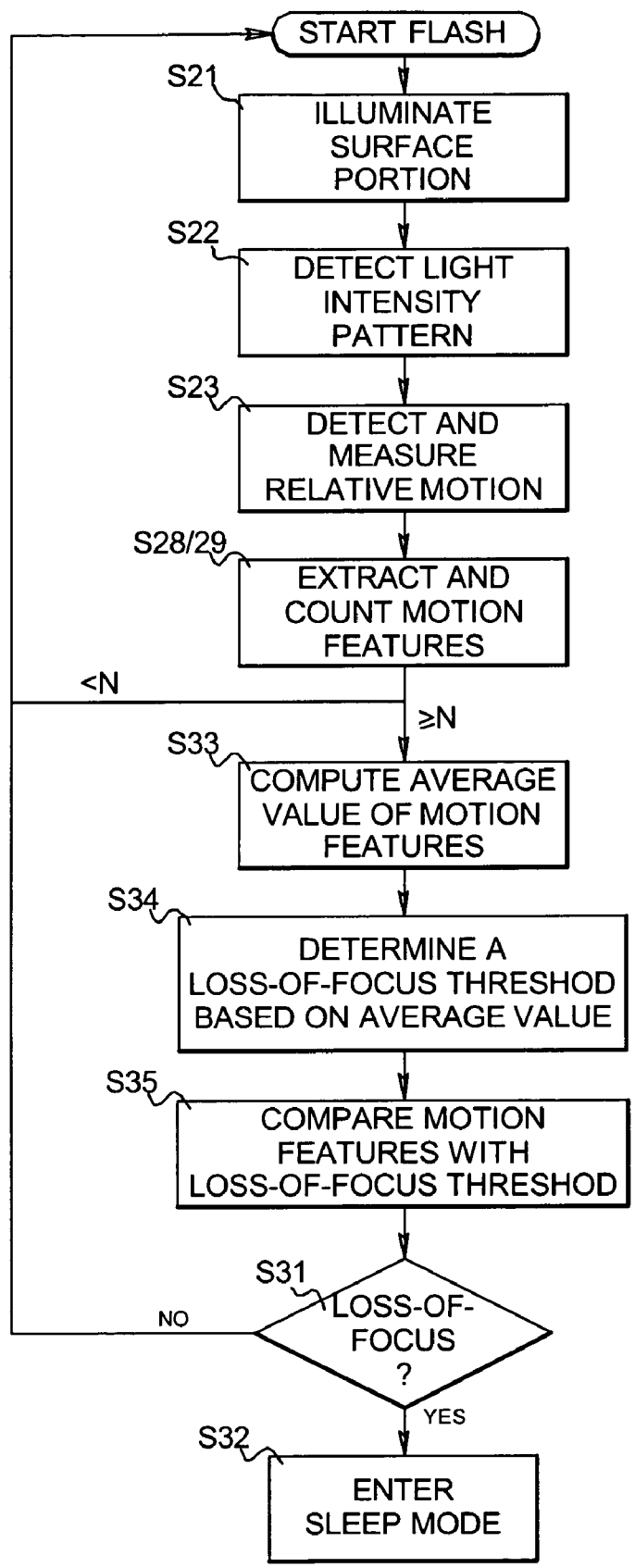
FIG. 4 is a flow chart showing the basic operations of the optical motion sensing device according to the second embodiment.
Figure 5:
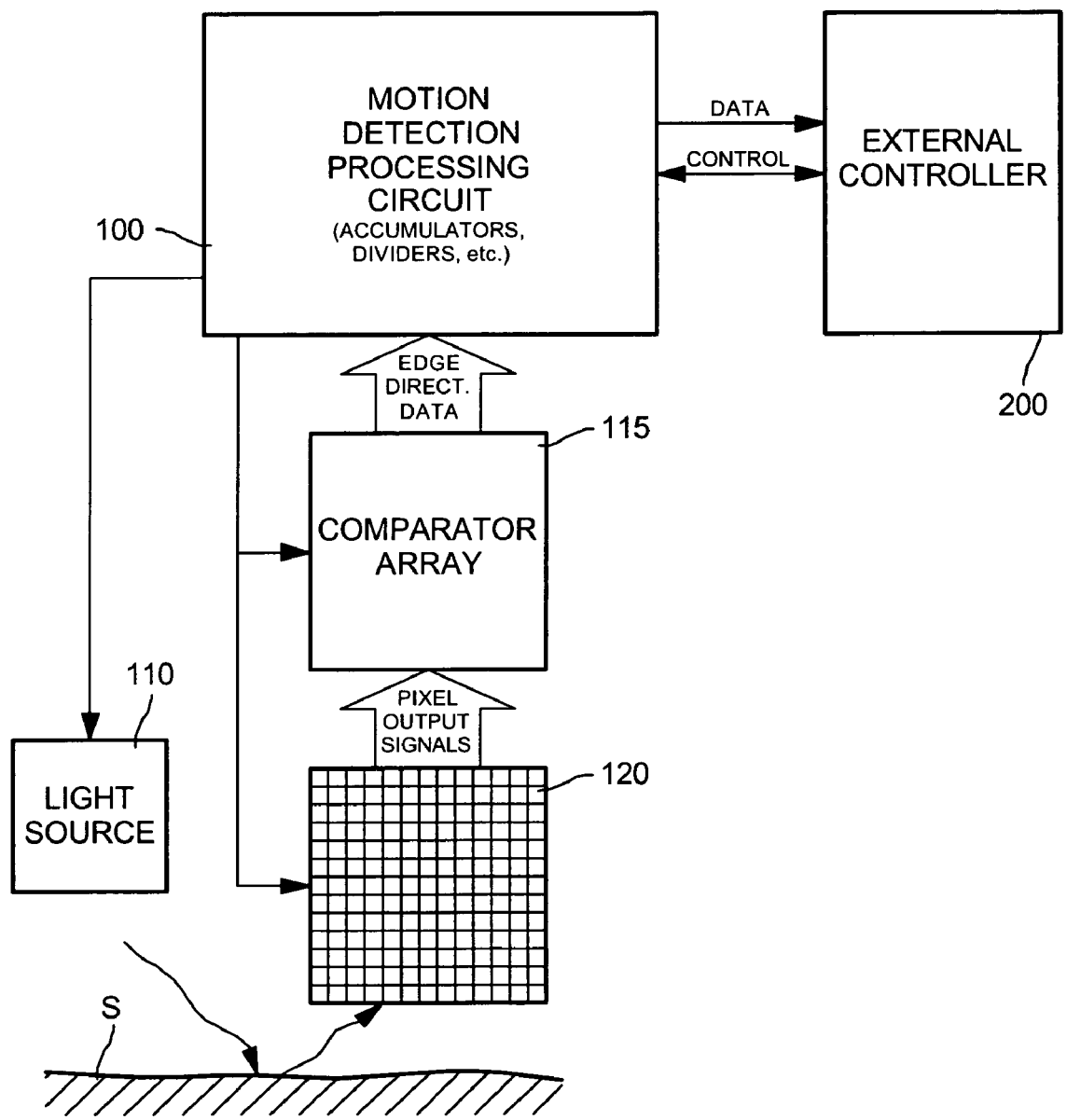
FIG. 5, already described, is a schematic block diagram of an optical pointing device according to the prior art.

FIG. 4 is a flow chart showing the basic operations of the optical motion sensing device according to the second embodiment for detecting a lift condition from an illuminated surface portion. The flow chart of FIG. 4 is similar to that of FIG. 2, with respect to steps S21, S22, S23, S28/29, S31 and S32 respectively corresponding to steps S1, S2, S3, S8/9, S11 and S12.

After an initialisation of the optical motion sensing device or after wake-up following to a sleep mode period, steps S21 to S29 are repeated since at least N values of the total number of motion features extracted during N flash periods have been transmitted from motion sensing unit 30 to control unit 40.

Then on the basis of the N received total numbers of extracted motion features, following to step S29, the following additional steps are provided for each flash:

(S33): computing an average value (A) of the N total numbers of motion features received;
(S34): determining a loss-of-focus threshold (LoFth) as a function of the computed average value;
(S35): comparing the last or current total number of motion features (i.e. extracted during the last flash) with the determined loss-of-focus threshold;
(S31): detecting a loss-of-focus condition; i.e. detection of a lift condition if the total number of motion features is less than the determined loss-of-focus threshold (LoFth);
(S32): if so, control unit 40 enables entering into a sleep mode, or low consumption mode of the optical motion sensing device, namely the light source, the photodetector device and the motion sensing unit.

In general, each of the above-mentioned functions and features may be performed by specific-purpose units or by one or more multiple-purpose units. For instance, motion sensing unit 30 and control unit 40 might be merged into a single unit performing all of the above-functions. The subdivisions illustrated in FIGS. 1 and 3 should therefore be regarded as being solely functional.

Having described the invention with regard to certain specific embodiments, it is to be understood that these embodiments are not meant as limitations of the invention. Indeed, various modifications and/or adaptations may become apparent to those skilled in the art without departing from the scope of the annexed claims. For instance, the method for determining the loss of focus threshold used in the second embodiment could be used for determining the high loss of focus threshold (LoFth_high) used in the first embodiment which shall not be predetermined. It is understood that the proposed embodiments are not necessarily limited to the given method for detecting motion and there from extracting motion features.

The invention claimed is:

1. A method for detecting a lift condition from an illuminated surface portion of an optical motion sensing device comprising a light source and a photodetector device, said method comprising the steps of:
   a) illuminating a surface portion with radiation by means of the light source;
   b) detecting radiation reflected from the illuminated surface portion by means of the photodetector device;
   c) detecting and measuring relative motion of said optical motion sensing device with respect to the illuminated surface portion;
   d) outputting motion reports representative of a magnitude of the detected relative motion;
   steps a) to d) defining a flash period and being repeated at a selected flash rate, the method also comprising the steps of:
   e) comparing the magnitude of the detected relative motion with a predetermined threshold and adjusting accordingly the flash rate;
   f) comparing the adjusted flash rate with a predetermined flash rate threshold and determining there from whether said optical motion sensing device is moving or not;
   g) extracting motion features from said detected relative motion and counting a total number of said motion features and providing a loss-of-focus signal if said total number of motion features is less than a predetermined loss-of-focus threshold;
   wherein the method further comprises the steps of:
   h) switching between a first loss-of-focus threshold if said optical motion sensing device is moving and a second loss-of-focus threshold greater than said first loss-of-focus threshold if said optical motion sensing device is not moving;
   i) entering a low consumption mode if said loss-of-focus signal is provided.

2. The method for detecting a lift condition according to claim 1, wherein it further comprises the step of:
   j) setting the first loss-of-focus threshold to strictly less than 5% of a maximum total number of motion features detectable by said photodetector device, for detecting no lift condition, when said optical device is moving.

3. The method for detecting a lift condition according to claim 1, wherein it further comprises the step of:
   j) setting the first loss-of-focus threshold to zero, for detecting no lift condition when said optical motion sensing device is moving.

4. The method for detecting a lift condition according to claim 2, wherein it further comprises the step of:
   k) setting the second loss-of-focus threshold between 5% and 20% of a maximum total number of motion features detectable by said photodetector device when said optical mouse is not moving.

5. The method for detecting a lift condition according to claim 3, wherein it further comprises the step of:
   k) setting the second loss-of-focus threshold to 10% of a maximum total number of motion features detectable by said photodetector device when said mouse is not moving.

6. The method for detecting a lift condition according to claim 1, wherein motion features are edge inflection data extracted from edge direction data.

7. A method for detecting a lift condition from an illuminated surface portion of an optical motion sensing device comprising a light source and a photodetector device, said method comprising the steps of:
   a) illuminating a surface portion with radiation by means of the light source;
   b) detecting radiation reflected from the illuminated surface portion by means of the photodetector device;
   c) detecting and measuring a relative motion of said optical motion sensing device with respect to the illuminated surface portion;
   g) extracting motion features from said detected relative motion and counting a total number of said motion features and providing a loss-of-focus signal if said total number of motion features is less than a loss-of-focus threshold;
   wherein the method further comprises the steps of:

l) computing an average value with at least some of the previous total number of motion features counted over a sliding predetermined period of time and determining said loss-of-focus threshold as a function of said computed average value;

m) entering a low consumption mode if said loss-of-focus signal is provided.

8. The method for detecting a lift condition according to claim 7, wherein the determined loss-of-focus threshold is set between 30% and 70% of the computed average value of step I).

9. The method for detecting a lift condition according to claim 7, wherein the determined loss-of-focus threshold corresponds to half the computed average value of step I).

10. The method for detecting a lift condition according to claim 9, wherein said average value is based on non successive total numbers of motion features received every $M^{th}$ flashes.

11. The method for detecting a lift condition according to claim 7, wherein motion features are edge inflection data extracted from edge direction data.

12. An optical motion sensing device comprising:
a light source for illuminating a surface portion with radiation;
a photodetector device responsive to radiation reflected from the illuminated surface portion;
a motion sensing unit coupled to the photodetector device for detecting and measuring a relative motion with respect to the illuminated surface portion, the motion sensing unit being adapted to output motion reports representative of a magnitude of the detected relative motion;
the light source, the photodetector device and the motion sensing unit being operated during a defined flash period and at a selected flash rate;
a control unit for adjusting the flash rate as a function of the magnitude of the relative motion detected by the motion sensing unit, said control unit being adapted to compare the magnitude of the detected relative motion with a predetermined relative motion threshold and adjust accordingly the flash rate, said control unit being further adapted to compare said adjusted flash rate with a predetermined flash rate threshold and determine there form whether said optical motion sensing device is moving or not;
said motion sensing unit being further adapted to extract motion features from the detected relative motion, counting a total number of said motion features and providing a loss-of-focus signal if said total number of motion features is less than a predetermined loss-of-focus threshold,
wherein said control unit is further adapted to switch between a first loss-of-focus threshold if said optical motion sensing device is moving and a second loss-of-focus threshold greater than said first loss-of-focus threshold if said optical motion sensing device is not moving and to enable said optical motion sensing device entering into a low consumption mode after reception of a loss-of-focus signal.

13. An optical motion sensing device comprising:
a light source for illuminating a portion of a surface with radiation;
a photodetector device responsive to radiation reflected from the illuminated surface portion;
a motion sensing unit coupled to the photodetector device for detecting and measuring a relative motion with respect to the illuminated surface portion; said motion sensing unit being further adapted to extract motion features from the detected relative motion, count a total number of said motion features and provide a loss-of-focus signal if said total number of motion features is less than a predetermined loss-of-focus threshold,
wherein said optical motion sensing device further comprises:
a control unit for computing an average value with at least some of the previous total number of motion features counted over a sliding predetermined period of time and determining a loss-of-focus threshold as a function of said computed average value,
said control unit being further adapted to enable said optical motion sensing device entering into a low consumption mode after reception of said loss-of-focus signal.

* * * * *